United States Patent [19]

Cowley et al.

[11] Patent Number: 5,122,240

[45] Date of Patent: Jun. 16, 1992

[54] ELECTROCHEMICAL PROCESSING OF AQUEOUS SOLUTIONS

[75] Inventors: Gerald Cowley, Mississauga; Marek Lipsztajn, Rexdale; Zbigniew Twardowski, Mississauga, all of Canada

[73] Assignee: Tenneco Canada Inc., Islington, Canada

[21] Appl. No.: 535,165

[22] Filed: Jun. 8, 1990

[51] Int. Cl.⁵ ............ C25B 1/16; C25B 1/22; C25B 1/26

[52] U.S. Cl. .................... 204/101; 204/92; 204/98

[58] Field of Search ............ 204/101, 92, 95, 98

[56] References Cited

U.S. PATENT DOCUMENTS

| | | | |
|---|---|---|---|
| 2,376,935 | 5/1945 | Persson | 423/478 |
| 3,864,456 | 2/1975 | Winfield et al. | 423/478 |
| 4,024,043 | 5/1977 | Dege et al. | 204/296 |
| 4,057,481 | 11/1977 | Lee et al. | 204/296 |
| 4,081,520 | 3/1978 | Swindells et al. | 423/478 |
| 4,115,217 | 9/1978 | Larsson et al. | 423/478 |
| 4,116,889 | 9/1978 | Chlanda et al. | 521/27 |
| 4,129,484 | 12/1978 | Larsson | 204/101 |
| 4,180,815 | 12/1979 | Hill | 343/6.5 R |
| 4,253,900 | 3/1981 | Dege et al. | 156/309.3 |
| 4,355,116 | 10/1982 | Lee et al. | 521/27 |
| 4,465,658 | 8/1984 | Fredette | 423/478 |
| 4,473,540 | 9/1984 | Fredette | 423/479 |
| 4,584,246 | 4/1986 | Liu et al. | 428/522 |
| 4,627,969 | 12/1986 | Fredette et al. | 423/478 |
| 4,673,454 | 6/1987 | Liu et al. | 156/281 |
| 4,678,655 | 7/1987 | Twardowski | 423/478 |
| 4,806,215 | 2/1989 | Twardowski | 204/101 |

Primary Examiner—John Niebling
Assistant Examiner—Brian M. Bolam
Attorney, Agent, or Firm—Sim & McBurney

[57] ABSTRACT

The formation of sodium sulfate by-product in sulfuric acid-based chlorine dioxide generating processes is decreased and preferably eliminated entirely, by effecting electrochemical treatment of sodium ion-containing feed materials for the generator to remove sodium ions and add hydrogen ions. Sodium hydroxide is produced as a by-product. The process is generally applicable to the electrochemical treatment of alkali metal chlorates, alkali metal sulfates and mixtures thereof to produce acidified solutions useful in providing chlorate ion-containing feeds to such chlorine dioxide generating processes.

4 Claims, 2 Drawing Sheets

ELECTROCHEMICAL PROCESSING OF AQUEOUS SOLUTIONS

FIELD OF INVENTION

The present invention relates to the electrochemical processing of aqueous solutions to produce acidic media for a plurality of applications, in particular in the production of chlorine dioxide.

BACKGROUND TO THE INVENTION

Chlorine dioxide, useful as a pulp mill bleaching agent, is produced chemically by reduction of an acid aqueous chlorate solution in accordance with the equation:

$$ClO_3^- + 2H^+ + e^- \rightarrow ClO_2 + H_2O$$

where the electron $e^-$ is supplied by various reducing agents, for example, methanol, chloride ion and hydrogen peroxide. In many commercial processes for effecting this reaction, the acidity for the process is provided by sulfuric acid while the chlorate ions are provided by sodium chlorate. The presence of these species leads to the formation of some form of sodium sulfate as a by-product.

One particular embodiment of a commercial process is the so-called "R8" process of the assignee of this application, as described in U.S. Pat. No. 4,081,520, assigned to the assignee herein and the disclosure of which is incorporated herein by reference. Improvements in and modifications to that process also are described in the assignee's U.S. Pat. Nos. 4,465,658, 4,473,540 and 4,627,969, the disclosures of which are incorporated herein by reference.

In that chlorine dioxide generating process, the reaction medium is at a high total acid normality of sulfuric acid and is maintained at its boiling point under a subatmospheric pressure applied thereto. Methanol is used as a reducing agent for chlorate ions, resulting in the formation of chlorine dioxide in a substantially pure form. The boiling nature of the reaction medium produces steam which acts as a diluent for the gaseous chlorine dioxide, so as to prevent decomposition of the chlorine dioxide.

The sodium sulfate by-product builds up in the reaction medium after start-up until the solution is saturated with sodium sulfate, whereupon the sodium sulfate precipitates from the reaction medium. A slurry of the sodium sulfate is removed from the reaction vessel, the crystalline sodium sulfate is filtered therefrom and the mother liquor is recycled to the reaction zone after the addition of make-up quantities of sodium chlorate, sulfuric acid and methanol.

This process is highly efficient and rapidly produces chlorine dioxide in commercial quantities. As may be concluded from the above equation, for each mole of chlorine dioxide produced a mole of chlorate ion and hence of sodium ion is introduced to the reaction medium. The sodium ions combine with the sulfate ions introduced with the sulfuric acid, to produce a sodium sulfate, which may be sodium bisulfate or, more normally under the conditions of an R-8 process, the double salt sodium sesquisulfate, i.e., $Na_3H(SO_4)_2$ (or $NaHSO_4.Na_2SO_4$), depending on the acidity of the solution.

Another sulfuric acid-based chlorine dioxide generating process, a low acidity "R3" process, as described in U.S. Pat. No. 3,864,456, the disclosure of which is incorporated herein by reference, produces neutral sodium sulfate as the by-product.

Such by-product sodium sulfate and sodium sesquisulfate (sometimes termed "saltcake"), generally have been employed to make up sulfur losses in the pulp mill.

However, the adoption of high substitution of chlorine by chlorine dioxide in the chlorination stage of the bleach plant has led to saltcake by-product production from the chlorine dioxide generating process exceeding the mill make-up requirements.

There exists a need, therefore, for a chlorine dioxide generating process which possesses the attributes of, for example, the R8 process, while, at the same time, producing less sodium sulfate by-product for the same level of production of chlorine dioxide. It is even more advantageous if, in addition to a lower saltcake production, caustic soda solution is co-produced together with $ClO_2$, thus minimizing an $NaOH/Cl_2$ imbalance presently existing in pulp mills.

It has previously been suggested in U.S. Pat. No. 4,129,484 to treat aqueous effluent from chlorine dioxide generating processes electrolytically to form an acid-enriched fraction from the original solution, which then may be recycled to the chlorine dioxide generator.

In order to utilize the by-product saltcake, it was proposed in the prior art to employ an electrochemical process to convert sodium sulfate into sulfuric acid and caustic soda solution in a three-compartment electrolytic cell, equipped with a cation-exchange membrane facing the cathode and an anionic membrane or a diaphragm facing the anode, wherein the saltcake solution is fed to the middle compartment. In an electric field, sodium and sulfate or hydrogen sulfate ions are transferred to the cathodic and anodic compartments respectively where they recombine with electrolytically-generated hydroxyl and hydrogen ions to form caustic soda and sulfuric acid, respectively.

Analogously, in a simplified process, a two-compartment electrolytic cell equipped with a cation exchange membrane was proposed to generate a mixture of sulfate and sulfuric acid in an anodic compartment along with caustic soda solution in the cathodic compartment.

The main drawback of these prior proposals was that the sulfuric acid solution produced had a low acid strength (less than 10 wt % $H_2SO_4$), which imposes an excessive evaporative load on the chlorine dioxide generator, thereby rendering the process uneconomical and impractical.

Although higher sulfuric acid concentrations can be achieved in the electrochemical splitting of saltcake in the manner described in the prior art, the current efficiency for such a process is prohibitively low due to the leakage of $H^+$ ions through the ion-exchange membrane. Such migration of hydrogen ions towards the cathode is related to a very high mobility of this ion relative to $Na^+$ ions.

For example, in the aforementioned U.S. Pat. No. 4,129,484, current efficiencies as low as 9% for production of about 1 normal caustic soda solution and 39% for production of about 2M sulfuric acid were reported.

SUMMARY OF INVENTION

In order to counteract the undesired migration of hydrogen ions towards the cathode and hence maximize the current efficiency for an acidification process, the electrolytic process is effected, in accordance with the invention, while maintaining a high concentration ratio of Na+/H+ in the anolyte.

In one embodiment of the present invention, there is provided an electrochemical process for the treatment of sodium sulfate/sodium chlorate mixtures, so as to acidify the same and provide acid for the chlorine dioxide generating process, while coproducing aqueous sodium hydroxide solution. Although the co-production of aqueous sodium hydroxide solution is most desired for the pulp mill applications, any other suitable cathodic reactions, for example, an electroreduction of oxygen to hydrogen peroxide and sodium hydroxide, can be carried out in combination with the anodic acidification of the salt mixtures.

The process of the invention is more widely applicable than to the treatment of such mixtures. Rather the invention is broadly directed to the treatment of aqueous solutions of certain alkali metal salts and mixtures thereof to form an aqueous acidified medium.

In one aspect, the present invention is broadly directed to a method for the production of an aqueous acidified chlorate ion-containing solution which is useful on a feed stream for a chlorine dioxide generating process wherein chlorate ions are reduced to chlorine dioxide in an aqueous acid medium.

An aqueous solution of at least one alkali metal salt selected from the group consisting of alkali metal chlorate, alkali metal sulfate and mixtures of alkali metal chlorate and alkali metal sulfate is electrochemically acidified.

Alkali metal ions are electrochemically removed from the aqueous solution to produce an acidified alkali metal salt solution which constitutes the aqueous acidified chlorate ion-containing solution when the alkali metal salt is selected from the group consisting of alkali metal chlorate and mixtures of alkali metal chlorate and alkali metal sulfate.

When the alkali metal salt is alkali metal sulfate, alkali metal chlorate is added to the acidified alkali metal salt solution to provide the aqueous acidified chlorate ion-containing solution.

One manner of effecting the procedure employs an electrolytic cell comprising a cation-exchange membrane dividing the cell into an anode compartment and a cathode compartment. The aqueous solution of at least one alkali metal salt is fed to the anode compartment and hydrogen ions are electrolytically produced in the anode compartment while alkali metal ions are transferred from the anode compartment through the cation-exchange membrane to the cathode compartment. The acidified alkali metal salt solution is removed from the anode compartment.

Alternatively, any other oxidation reaction producing hydrogen ions, for example, hydrogen gas oxidation to hydrogen ions, may be employed as an anodic reaction. Such anodic hydrogen gas oxidation may be combined with oxygen gas electroreduction as a cathodic reaction, to provide a fuel cell operation wherein, in addition to acidification of anolyte and production of alkali metal hydroxide solution in the catholyte, electrical energy is generated.

When an anodic oxidation of hydrogen gas to hydrogen ions is combined with a cathodic reduction of water to hydroxyl ions and hydrogen gas, the latter gas may be used as an anodic feed and, at the same time, a substantial energy savings may be achieved, as a result of the difference in electrochemical reaction potentials. Similarly, an analogous energy and material savings is achieved when an anodic oxidation of water to hydrogen ions and oxygen is combined with cathodic reduction of the oxygen gas stream.

In accordance with one embodiment of the present invention, there is provided an electrochemical process for the treatment of an aqueous solution of alkali metal salt mixtures, which comprises a plurality of steps. The aqueous solution is fed to the anode compartment of an electrolytic cell having a cation-exchange membrane dividing the cell into an anode compartment and a cathode compartment.

Hydrogen ions are electrolytically produced in the anode compartment and hydroxyl ions are electrolytically produced in the cathode compartment. Simultaneously alkali metal cations are transferred across the cation-exchange membrane from the anode compartment to the cathode compartment.

This migration of alkali metal cations and the electrochemical reaction producing hydrogen ions and hydroxyl ions have the effect of producing an alkali metal hydroxide solution in the cathode compartment and an acid of the anion of the alkali metal salts in the anode compartment. The respective aqueous solutions are removed from the compartments of the cell.

In order to achieve high current efficiencies of at least about 70%, preferably at least about 80%, and thereby provide an economic process, the molar ratio of $[Na^+]:[H^+]$ in the anolyte generally varies from about 1000:1 to about 1:5, preferably about 1000:1 to about 1:2, throughout the electrolytic reaction.

In another aspect of the present invention, the method for the production of aqueous acidified chlorate ion-containing solution is integrated into a chlorine dioxide generating process by providing an aqueous acid chlorine dioxide-generating reaction medium containing sulfuric acid and alkali metal ions in a reaction zone, feeding the aqueous acidified chlorate ion-containing solution to the reaction zone to provide chlorate ion and hydrogen ion reactants to the aqueous acid chlorine dioxide-generating reaction medium, and recovering an alkali metal sulfate from the reaction zone.

GENERAL DESCRIPTION OF INVENTION

Figure 1:
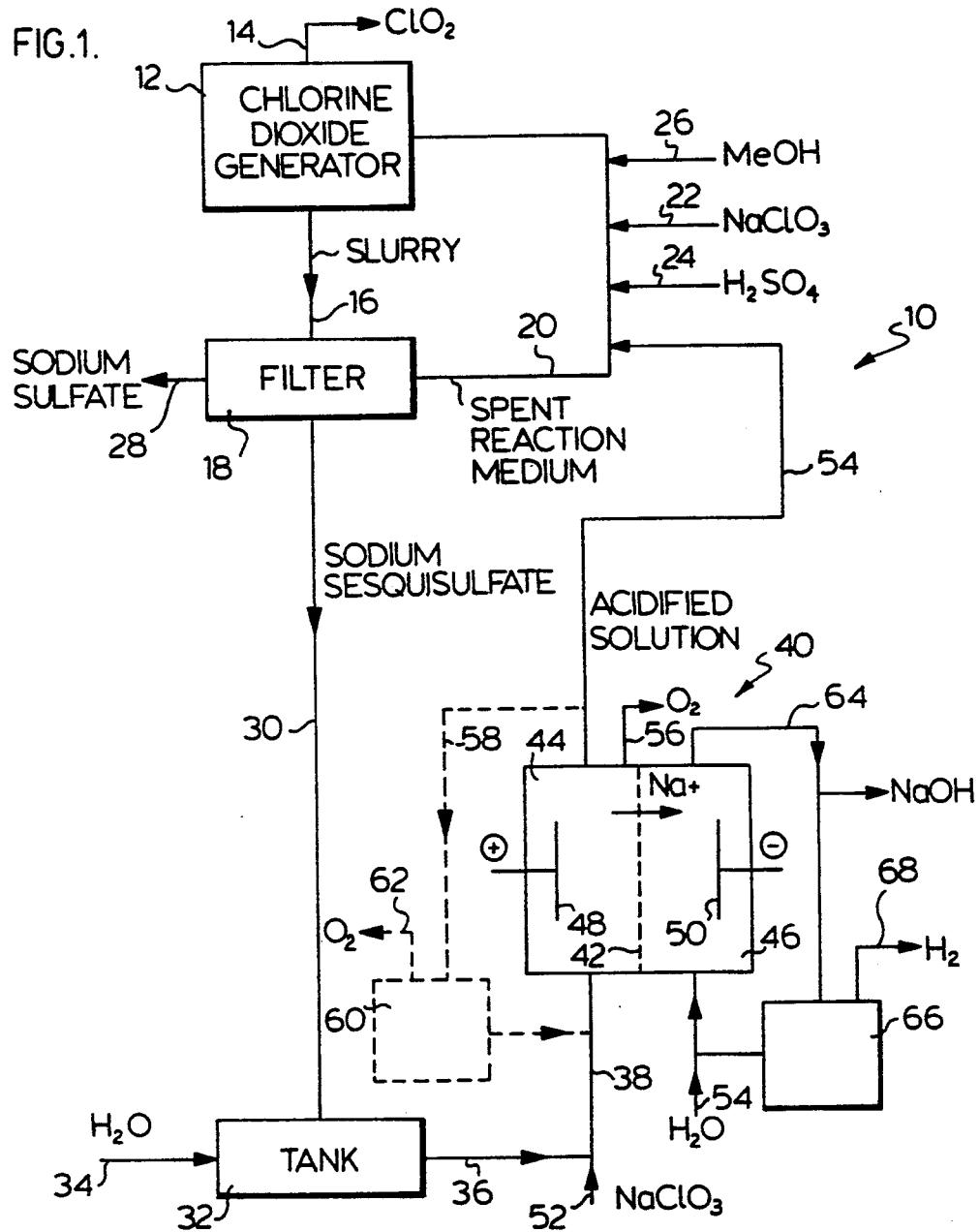
FIG. 1 is a flow sheet of a chlorine dioxide generating process provided in accordance with one embodiment of the invention.

As noted above, the present invention is directed generally to the electrochemical treatment of aqueous solutions of alkali metal salts and mixtures thereof to generate an aqueous acidified medium. The procedure of the present invention is particularly useful in sulfuric acid-based chlorine dioxide generating processes, since the invention enables the quantity of by-product alkali metal sulfate co-produced with the chlorine dioxide to be decreased and even eliminated entirely, while maintaining the same level of chlorine dioxide production.

In one embodiment of the present invention, an aqueous solution of at least one alkali metal salt which is alkali metal chlorate, alkali metal sulfate or, preferably, mixtures thereof is introduced to the anode compartment of a cation-exchange membrane divided electrochemical cell and alkali metal ions are transferred from the anode compartment to the cathode compartment. This procedure may be used in the present invention in different ways to achieve the decreased alkali metal sulfate output in a chlorine dioxide generating process. It is usual for chlorine dioxide generating processes to employ sodium salts, and hence in the following description of specific embodiments of the invention reference will be made to those sodium salts. However, it is apparent that the principles of the invention are applicable to salts of other alkali metals.

In a preferred embodiment of the invention, a combination of sodium chlorate and sodium sulfate, particularly in the form of sodium sesquisulfate, is fed to the anode compartment of the cell, since the presence of both salts enables the [Na+]/[H+] molar ratio in the anode compartment to be maximized, resulting in a high current efficiency and thereby lower power consumption. In addition, a higher overall current efficiency decreases the capital cost, since a lesser number of cells is required for the same production rate.

It is preferred to employ a saturated feed solution or a slurry, in order to minimize the resistance of the electrolyte, while maintaining a high [Na+]/[H+] ratio in the anode compartment. When the feed is in the form of a slurry, it usually is preferred to provide an additional separator or separators, such as an ion-exchange membrane or a diaphragm, between the feed stream and the anode to prevent abrasion and wear on the anode from occurring. Such additional separator also may be employed, if desired, if the feed does not comprise a slurry.

The cell produces an acidified solution from the mixed sodium chlorate/sodium sulfate feed in the anode compartment and a sodium hydroxide solution in the cathode compartment. The acidified solution then is fed to the chlorine dioxide generating process as an acid and chlorate source therefor.

When there is no need for the saltcake in particular pulp mill, it is preferred to operate the cell so as to remove from the mixed sodium chlorate/sodium sulfate feed a quantity of sodium ions corresponding to the quantity of sodium ions introduced with the sodium chlorate. The requirements of the chlorine dioxide generator for acid and chlorate thereby are completely satisfied, so that no additional sodium sulfate by-product is formed. Therefore, in effect, a dead load of sodium sulfate cycles between the chlorine dioxide generator and the cell.

When operating the process of the invention with sodium chlorate/sodium sulfate mixtures, it is preferred to dissolve sodium chlorate in the sodium sulfate solution. Alternatively, the sodium sulfate, in slurry or crystalline form, may be added to an aqueous sodium chlorate solution or, if desired, aqueous solutions of sodium sulfate and sodium chlorate may be mixed in any required proportion.

The composition of the anolyte feed may be prepared by a one-time mixing of the individual components, namely sodium sulfate and sodium chlorate, or by a gradual addition of one component to another in the course of electrolysis. For example, sodium sulfate can be pre-acidified in an electrolytic cell prior to the addition of sodium chlorate. In fact, the process can be carried out in such a way that neutral sodium sulfate or sodium sesquisulfate is acidified to bisulfate, NaHSO$_4$, and then this solution is used to dissolve sodium chlorate, in order to take advantage of an increased solubility of bisulfate with respect to other sulfates. The mixture can be forwarded to the generator or further acidified in an electrolytic cell.

From this discussion, it will be apparent that any combination of sodium sulfate and sodium chlorate may be selected to meet the requirements of a particular pulp mill. Production of sodium sulfate by-product may be permitted at any level desired by the pulp mill.

The presence of sodium sulfate (sesquisulfate) in the anolyte improves the [Na+/[H+] ratio not only due to an increase in sodium ion concentration but also as a result of a buffering action of the sulfate ions, which tend to recombine with hydrogen ions to form bisulfate, thereby decreasing the concentration of free hydrogen ions. In addition, a combined acidified chlorate/sulfate feed effectively decreases the amount of water introduced to the chlorine dioxide generator, as a result of a water "sharing" effect.

While operating the process using sodium chlorate/sodium sulfate mixtures provides a practically unlimited flexibility in selecting the extent of production of a by-product saltcake corresponding to between 0 to 100% recycling of sulfate, it also is possible to achieve a partial decrease in saltcake production by electrolytically acidifying a pure sodium chlorate feed solution, i.e. without any addition of sulfate. The overall reaction for such a process may be depicted as:

$$xNaClO_3 + 3H_2O \longrightarrow (x-2) NaClO_3 + 2HClO_3 + 2NaOH + \tfrac{1}{2}O_2 + H_2$$

Such a partial acidification of sodium chlorate leads to a mixture of sodium chlorate and chloric acid, in which the content of chloric acid determines the extent of reduction in sulfuric acid addition to the chlorine dioxide generator and, consequently, the production of sodium sulfate by-product. Since the [Na+/[H+] ratio constitutes a determining factor for the current efficiency of the acidification process, only partial conversion of sodium chlorate into chloric acid is feasible in this case. Usually, up to about a 20% reduction in saltcake by-product production can be achieved by acidification of a pure sodium chlorate feed at practical current efficiencies.

The aqueous sodium hydroxide solution which is co-produced in the present invention is readily used by the pulp mill in its bleach plant operations for the purification of bleached pulp. When pulp mills have an onsite electrolytic process for producing aqueous sodium hydroxide, usually from sodium chloride, Such process results in the co-production of chlorine. The ability to utilize such co-produced chlorine, however, is often limited, which leads to a caustic/chlorine imbalance in the pulp mill. By utilizing the process of the invention, not only is the problem of co-production of excess sodium sulfate in the chlorine dioxide generation process overcome, but also the problem of co-production of chlorine in sodium hydroxide production is overcome. The concentration of sodium hydroxide solution produced in the cathode compartment may be adjusted to any reasonable level, by adjusting flow rates and recycling product solution.

As noted above, the current efficiency of the process is largely dependent on the [Na+]/[H+] ratio in the anode compartment, which usually requires a deadload of sodium ion cycling between the cell and the chlorine dioxide generator which, in the embodiment disclosed above, may be provided by sodium sulfate as the deadload. However, any other sodium salt which does not otherwise adversely affect the production of chlorine dioxide may be employed.

The anode employed in the electrolytic cell may take any desired form, but it is preferred to employ a low overpotential one with respect to the oxygen evolution reaction, for example, a DSA-$O_2$ ® electrode. Similarly, any convenient material of construction may be used for the cathode, for example, nickel.

The cation-exchange membrane may be formed of any convenient material which enables cations to selectively pass therethrough in preference to anions. Preferably, the cation-exchange membrane is formed of perfluorocarbon polymer having pendant cation-exchange functional groups, such as those sold under the trademarks "NAFION" (DuPont) or "FLEMION" (Asahi Glass).

In the event an additional ion exchange membrane or membranes is used in the anode compartment, such membrane may be formed of any convenient ion-exchange material.

In one embodiment of the invention in which electrodialysis utilizing bipolar membranes is employed, the aqueous solution of a mixture of alkali metal salts is processed in a plurality of unit cells, with each unit cell being separated from the adjacent ones by bipolar membranes. The bipolar membranes have an anionic face in the base compartment of one cell and a cationic face in the acid compartment of an adjacent cell. The individual cells are divided by a cation exchange membrane.

With the plurality of cells separated by bipolar membranes, gas evolution does not take place in the acid and base compartments, and the overall reaction may be represented by the equation:

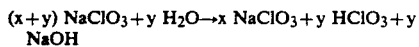
$$(x+y) NaClO_3 + y H_2O \rightarrow x NaClO_3 + y HClO_3 + y NaOH$$

The plurality of cells is terminated at both ends by cationic membranes. A separate electrode rinse solution, such as a sodium sulfate solution, is circulated between the cathodic and anodic compartments adjacent to the cathode and anode respectively. A single electrical current feed, therefore, is used to effect acidification in parallel in a plurality of unit cells, with gaseous evolution occurring only in the end anode and cathode compartments.

Bipolar membranes and their operation are well known and are described, for example, in U.S. Pats. Nos. 4,024,043, 4,180,815, 4,057,481, 4,355,116, 4,116,889, 4,253,900, 4,584,246 and 4,673,454 and reference may be had to such patents for details thereof.

The parameters of operation of the cell are not critical to the process of the invention and may vary widely. For example, the electrolytic process may be effected under any desired electrolytic conditions, generally at a membrane current density of about 0.01 to about 10 kA/m², preferably about 1 to about 5 kA/m².

Similarly, the process may be carried out over a wide range of temperatures, generally from about 0° to about 150° C., preferably from about 15° to about 90° C. Generally, higher temperatures are preferred, in view of the generally greater solubility of the alkali metal salts at higher temperatures, thereby enhancing the [$Na^+$]/[$H^+$] ratio. This greater solubility at high temperature is particularly true of sodium chlorate, so that, when such salt is included in the feed to the cell, higher temperature operation, above about 60° C., is preferred. The acidified product stream from the electrolysis retains a high concentration of sodium chlorate, so that cooling of that product stream prior to passage to the chlorine dioxide generator may lead to precipitation of sodium chlorate, which can be removed and recycled to the cell feed.

As already described, one important parameter influencing current efficiency is the molar ratio of [$Na^+$]/[$H^+$] in the anode compartment. Generally, this molar ratio varies from about 1000:1 to about 1:5, preferably about 1000:1 to about 1:2. Such a ratio is dependent on the concentration of the feed solution to the anode compartment and the extent to which sodium ions are transferred from the anode compartment to the cathode compartment. Accordingly, it is preferred to employ a feed solution having a concentration of about 0.1 to about 15M in sodium ions and to remove from the anode compartment for feed to the chlorine dioxide generation process an acidified solution having a concentration of about 0.1 to about 12M in sodium ions.

The electrolytic process increases the total acid normality of the alkali metal salt solution. Depending on the initial total acid normality and the degree of electrolysis effected on the feed material, it may be desirable to concentrate, such as by evaporation, the product stream to increase its total acid normality, prior to feed to the chlorine dioxide generation process. Generally, the total acid normality of the feed solution varies from about neutral to about 12 normal, preferably about 0.1 to about 10 normal, and the electrolysis is effected to such a degree as to provide a product stream from the anode compartment having a total acid normality generally from about 0.2 to about 15 normal, preferably about 0.5 to about 6 normal.

DESCRIPTION OF PREFERRED EMBODIMENTS

Referring to the drawings, FIG. 1 depicts an embodiment of the application of the principles of the present invention to the production of chlorine dioxide.

There is shown therein a chlorine dioxide generating operation 10 comprising a chlorine dioxide generating process 12 wherein sodium chlorate, sulfuric acid and methanol are reacted at the boiling point of the reaction medium under a sub-atmospheric pressure, to produce gaseous chlorine dioxide in line 14 (i.e. the R8 process).

The chlorine dioxide generating process in the generator 12 results in the precipitation of a by-product sodium sulfate, once the reaction medium has become saturated after start-up. The form of the by-product sodium sulfate, namely neutral sodium sulfate, sodium sesquisulfate, sodium bisulfate or mixtures thereof, depends on the total acid normality of the reaction medium, which may vary from about 2 to about 11 normal.

The crystalline sodium sulfate (sometimes termed "saltcake") is removed from the reaction medium in the form of a slurry with spent reaction medium by line 16 and is passed to a filter 18 wherein the crystalline material is separated from the spent reaction medium.

The separated spent reaction medium in line 20 is recycled to the generator 12 with make-up reactants, namely sodium chlorate, sulfuric acid and methanol, being fed to the recycle stream in line 20 by lines 22, 24 and 26 respectively.

The crystalline sodium sulfate separated in the filter 18 may be removed by line 28 for use elsewhere in the pulp mill in whatever proportion (including zero) of the sodium sulfate in the slurry 16 is desired.

The portion of the sodium sulfate not removed by line 28 is forwarded by line 30 to a dissolving tank 32, wherein the sodium sulfate is dissolved in water fed by line 34 to form an aqueous solution which is preferably saturated. This solution is forwarded by lines 36 and 38 to a membrane-divided electrolysis cell 40. It is not necessary that the sodium sulfate be completely dissolved in water, but may be fed as a slurry thereof. Where such a slurry is employed, it is generally desirable to isolate the anode from the slurry in the cell 40, to avoid excessive wear resulting from abrasion.

The cell 40 comprises a cation-exchange membrane 42, which divides the interior of the cell 40 into an anode compartment 44 and a cathode compartment 46 in which are located cell anode 48 and cell cathode 50 respectively.

Sodium chlorate is added to the sodium sulfate solution in line 36 by line 52 to form in line 38 a feed solution for the anode compartment 44 of the cell 40. An electrolyte is fed by line 54 to the cathode compartment 46. A current is applied between the anode 48 and the cathode 50. The sodium chlorate may be added by line 52 in the form of an aqueous solution thereof or as solid sodium chlorate.

In the cell 40, several reactions occur simultaneously. At the anode 48, water is electrolyzed to oxygen and hydrogen ion, as follows:

$$H_2O \rightarrow \tfrac{1}{2}O_2 + 2H^+ + 2e^-$$

while at the cathode 50 water is electrolyzed to hydrogen and hydroxyl ion, as follows:

$$e^- + H_2O \rightarrow \tfrac{1}{2}H_2 + OH^-$$

At the same time, sodium ions in the aqueous solution or slurry of a mixture of sodium sulfate and sodium chlorate migrate under the influence of the applied current from the anode compartment 44 across the cation-exchange membrane 42 to the cathode compartment 46. In effect, therefore, the electrolytically-produced hydrogen ions replace the sodium ions in the anode compartment 44 and the transferred sodium ions are available to combine with the electrolytically-produced hydroxyl ions in the cathode compartment 46.

The sodium sulfate contained in the solution feed in line 38 to the cell 40 can be considered to be a deadload circulating via the generator 12 in a closed loop, so that the overall reaction in cell 40 can be considered to be represented, as follows:

$$xNaClO_3 + 3H_2O \longrightarrow$$
$$(x-2) NaClO_3 + 2HClO_3 + 2NaOH + \tfrac{1}{2}O_2 + H_2$$

where x is the molar amount of sodium chlorate which is processed.

The resulting chloric acid-containing solution then is recycled by line 54 to the recycle line 20, to provide acid and chlorate ion for the chlorine dioxide generator 12. The proportion of sodium sulfate removed from the system by line 28 corresponds to the proportion of the sulfuric acid and sodium chlorate reactants fed to the chlorine dioxide generation from external sources, namely by line 24 for sulfuric acid and by unconverted sodium chlorate in line 24 and in line 22. Under steady state operating conditions for a process precipitating sodium sesquisulfate and where no sodium sulfate product is required, the processing of the aqueous solution of a mixture of sodium sesquisulfate and sodium chlorate in the cell 40 provides all the hydrogen ions and chlorate ions necessary to sustain the reaction and additional sulfuric acid and sodium chlorate are not required.

In effect, therefore, sodium chlorate fed to the cell 40 is converted, at least partially, to chloric acid, so that the sodium sulfate component of the feed solution 38 is a dead-load cycling between the cell 40 and the chlorine dioxide generator 12.

Oxygen is vented from the anode compartment 44 by line 56. Alternatively, the product stream may be recycled by line 58, with oxygen being vented from a gas-liquid separator 60 by line 62, wherein recycle of anolyte is required to achieve the desired acid normality of the acidified solution 54.

The sodium hydroxide produced in the cathode compartment 46 is recycled by line 64, through a gas-liquid separator 66 from which hydrogen is vented by line 68, until the desired concentration of sodium hydroxide solution is achieved. The resulting aqueous sodium hydroxide solution is removed as an aqueous product stream in line 70. This solution has considerable utility in a pulp mill, particularly as a chemical employed in the purifying and bleaching operations effected in the bleach plant of the pulp mill. The gaseous by-products, namely hydrogen and oxygen, also can be utilized in the pulp mill.

High current efficiency for the electrolytic process effected in the cell 40 as described above can be attributed to the high $[Na^+]/[H^+]$ molar ratio in the anode compartment 44 and also to the buffering effect of $SO_4^{2-}$ ions towards hydrogen ions, which tends to maintain the free hydrogen ion concentration in the anode compartment low, thereby tending to maintain the high $[Na^+]/[H^+]$ molar ratio.

As may be seen from the above description, the process of FIG. 1 produces chlorine dioxide by the R8 process and hence retains the benefits thereof. More importantly, the process does not produce any excess by-product sodium sulfate requiring disposal. The amount of sodium sulfate which is produced can be tailored to the mill requirement, or may be eliminated entirely. In effect, when there is no requirement for the saltcake in the pulp mill, the sodium sulfate is maintained in a closed loop within the process and the sodium ions introduced to the chlorine dioxide generating process with the sodium chlorate, exit the process in the form of aqueous sodium hydroxide solution. The acid for the chlorine dioxide generating process is produced electrolytically from water, which co-produces the hydroxyl ions required to combine with the sodium ions to form the sodium hydroxide.

Figure 2:
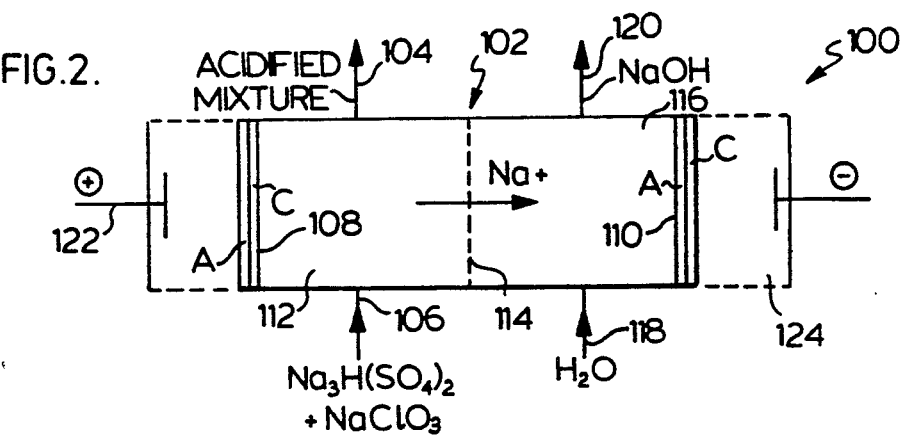
FIG. 2 is a schematic illustration of a bipolar membrane cell which may be employed with the chlorine dioxide generating process of FIG. 1.

Referring to FIG. 2, there is shown therein the utilization of a bank 100 of unit cells, with the individual cells 102 producing an acidified mixture in line 104 for feeding to a chlorine dioxide generator, as described with respect to FIG. 1, from an aqueous feed mixture of sodium sesquisulfate and sodium chlorate in line 106. The number of unit cells 102 in the bank of cells may vary widely, depending on the required production capacity and typically may vary from about 20 to about 500.

Each unit cell 100 is separated from each adjacent unit cell by bipolar membranes 108, 110. The bipolar membrane 108 has its cationic face in an acid compartment 112, so as to form hydrogen ions under the influence of the electric current applied to the bank of cells 100, thereby acidifying the feed mixture, while sodium ions are transported from the acid compartment 112 across a cation-exchange membrane 114 to a base compartment 116.

The bipolar membrane 110 has its anionic face in the base compartment 116, so as to form hydroxyl ions from the aqueous feed thereto in line 118 under the influence of the electrical current applied to the bank of cells 100. In this way, sodium hydroxide is formed in the base compartment 116 and is removed by line 120.

Only a single anode 122 and a single cathode 124 are required for the bank 100 of unit cells 102. Oxygen and hydrogen respectively are formed at the electrode surfaces and vented from the terminal unit cells.

EXAMPLES

Electrochemical experiments were carried out in a two-compartment MP cell, supplied by Electrocell AB, Sweden equipped with an oxygen-evolving anode (DSA-$O_2$®), nickel cathode and a cation exchange membrane (NAFION 427) dividing the cell into an anode compartment and a cathode compartment. The anode, cathode and membrane each had an area of 100 sq. cm.

In the experiments, a current density of 3 kA/$m^2$ was mainly employed (occasionally 2 kA/$m^2$), the anolyte was $NaClO_3$ or $NaClO_3$/$Na_2SO_4$/$H_2SO_4$ mixtures, the catholyte was 1N aqueous sodium hydroxide solution and the temperature was 40° to 50° C.

EXAMPLE 1

Figure 3:
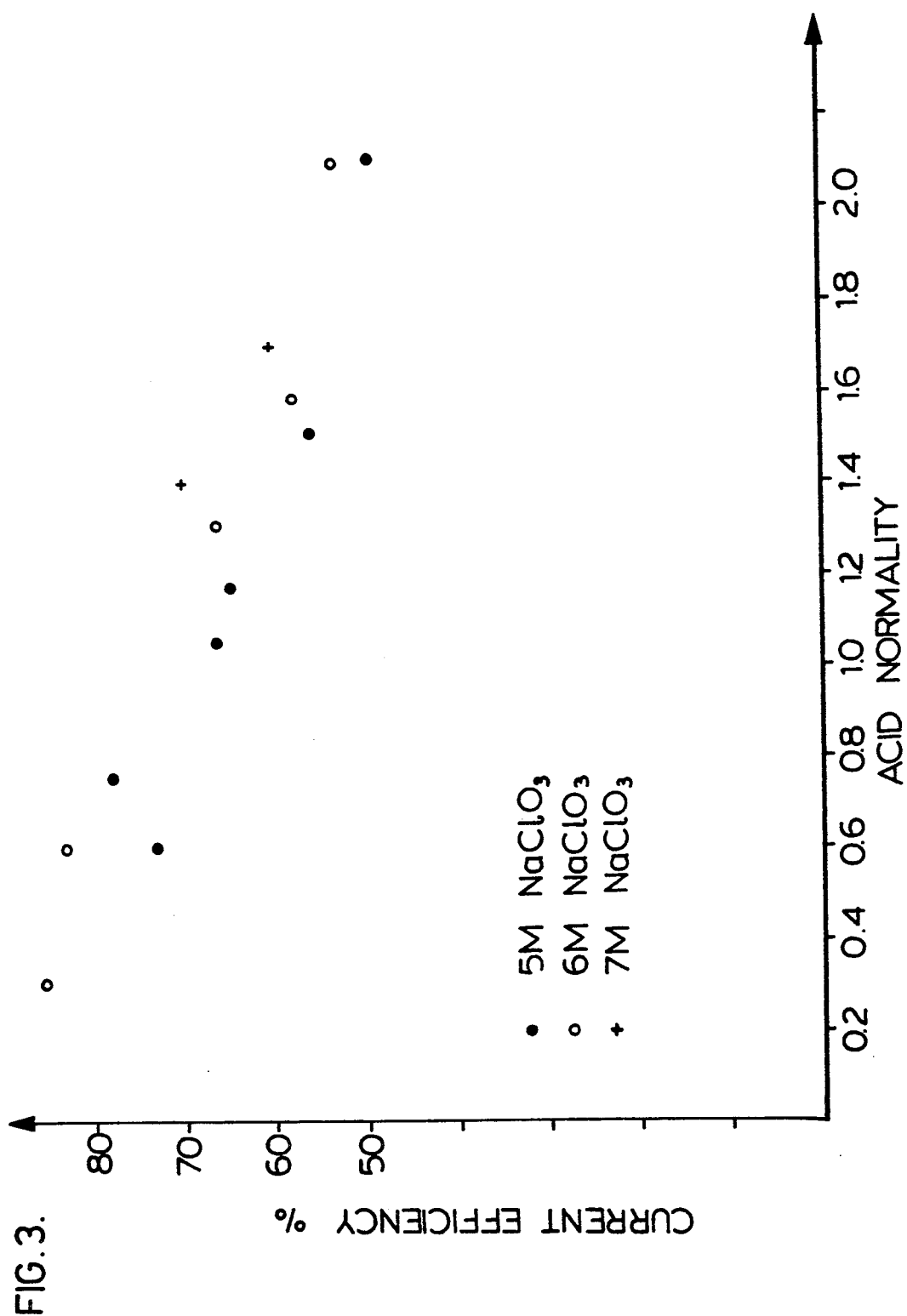
FIG. 3 contains a graphical representation of experimental data, illustrating the relationship of acid normality to current efficiency for different concentrations of alkali metal salt.

In a first set of experiments, aqueous solutions of sodium chlorate of various concentrations were used as the anolyte. During the course of electrolysis, the anolyte became enriched with hydrogen ions as the sodium chlorate was partially converted to chloric acid. Current efficiencies were determined at various product chloric acid concentrations for the various initial sodium chlorate concentrations and were plotted graphically. These results appear as FIG. 3.

It will be seen from the data presented in this Figure that the current efficiency declines with increasing H+ to Na+ mole ratio in the solution electrolyzed.

EXAMPLE 2

Various mixtures of sodium chlorate and $Na_2SO_4$/$H_2SO_4$ were prepared and electrolyzed.

(a) 1 L of an approximately 2M $Na_3H(SO_4)_2$ aqueous solution was prepared by mixing $Na_2SO_4$ and $H_2SO_4$ at a molar ratio of 3:1. Acidity was measured by titration with NaOH and the solution was determined to have an initial concentration of 1.94 normal. The catholyte was 0.5 L of 1N NaOH.

Current was imposed between the electrodes at a current density of 3 kA/$m^2$ and sodium chlorate crystals, in a total amount corresponding to the preparation of a 2M aqueous solution, were added slowly to the anolyte. A very rapid dissolution of sodium chlorate was observed. The increase in acidity of the anolyte was monitored by titration and the electrolysis was terminated when the acidity of the anolyte reached 4.12N. The basicity of the catholyte was determined to be 4.54N NaOH. The total time of electrolysis was 8583 seconds with the total charge passed being 257,490 A.sec.

In the calculation of the current efficiency, the volume changes of the anolyte and catholyte were taken into account, since water is transported to the catholyte together with Na+ ions and also is consumed in the electrolysis. The current efficiency based on the increase in acidity of the anolyte was determined to be 79% while that based on the increase in basicity of the catholyte was 80%.

The overall conversion in the anolyte can be depicted as:

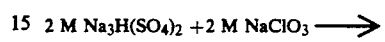

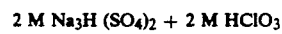

with an equivalent amount of caustic being co-produced in the cathode compartment. Hydrogen (cathode) and oxygen (anode) were the gaseous by-products. All the reactants and products depicted by this equation are largely dissociated in the solution into the ionic species Na+, H+, $HSO_4^-$, $SO_4^{2-}$ and $ClO_3^-$. However, since sesquisulfate contributes a prevailing form of the precipitate formed in the chlorine dioxide generator, chloric acid ($HClO_3 = H^+ + ClO_3^-$) is liberated from such a mixture upon precipitation of sesquisulfate.

(b) Other mixtures of sodium chlorate and sodium sesquisulfate were processed in a similar way to that described in experiment (a), with quantitative (1 to 4) or partial (5) conversion of the sodium chlorate to chloric acid. The results obtained are reproduced in the following Table I:

TABLE I

| Reactant Expt No. | Concentrations(M) Sesqui | Concentrations(M) $NaClO_3$ | Acidity (N) Initial | Acidity (N) Final | Electrolysis Conditions C.D. (kA/$m^2$) | Electrolysis Conditions C.E. (%) |
|---|---|---|---|---|---|---|
| 1 | 2 | 1.5 | 2.01 | 3.66 | 2 | 81 |
| 2 | 1.75 | 2 | 1.81 | 3.95 | 3 | 76 |
| 3 | 1.5 | 2 | 1.48 | 3.6 | 3 | 75 |
| 4 | 1 | 2 | 1.0 | 2.9 | 2 | 63 |
| 5 | 1 | 4 | 0.92 | 2.06 | 3 | 85 |

It will be seen from this Table and the data in (a) above, that an improvement in current efficiency is obtained by the presence of sulfate ion in conjunction with a high [Na+]/[H+] ratio, as compared with the results obtained in Example 1. For example, 1.5M $HClO_3$ can be obtained at about 60% C.E. in pure aqueous sodium chlorate solution and at about 80% C.E. in the mixtures of sodium sesquisulfate and sodium chlorate.

SUMMARY OF DISCLOSURE

In summary of this disclosure, the present invention provides a novel electrochemical process which enable the quantity of by-product sodium sulfate produced by a chlorine dioxide generating process to be decreased. Modifications are possible within the scope of this invention.

What we claim is:

1. An electrochemical process for the treatment of an aqueous solution of a mixture of alkali metal salts comprising alkali metal sulfate and alkali metal chlorate at a current efficiency of at least about 70%, which comprises:

forming said aqueous solution from solid phase alkali metal sulfate and solid phase alkali metal chlorate, feeding said aqueous solution to the anode compartment of an electrolytic cell having a cation exchange membrane dividing said cell into an anode compartment and a cathode compartment, electrolytically producing hydrogen ions in said anode compartment at a molar ratio of alkali metal ion to hydrogen ion of about 1000:1 to about 1:5 and hydroxyl ions in said cathode compartment while simultaneously effecting transfer of alkali metal cations from said anode compartment through said cation-exchange membrane to said anode cathode compartment, removing an aqueous alkali metal hydroxide solution from said cathode compartment and removing an acidified aqueous solution from said anode compartment.

2. The process of claim 1 wherein said molar ratio is about 1000:1 to about 1:2.

3. The process of claim 2 wherein said alkali metal sulfate is selected from the group consisting of neutral alkali metal sulfate, alkali metal sesquisulfate alkali metal bisulfate, and mixtures thereof.

4. The process of claim 3 wherein said alkali metal is sodium.

* * * * *